Sept. 1, 1964  H. C. BRIDWELL  3,146,837
SYSTEM FOR OBTAINING TRUE CORE SAMPLES
Filed Dec. 30, 1958  4 Sheets-Sheet 1
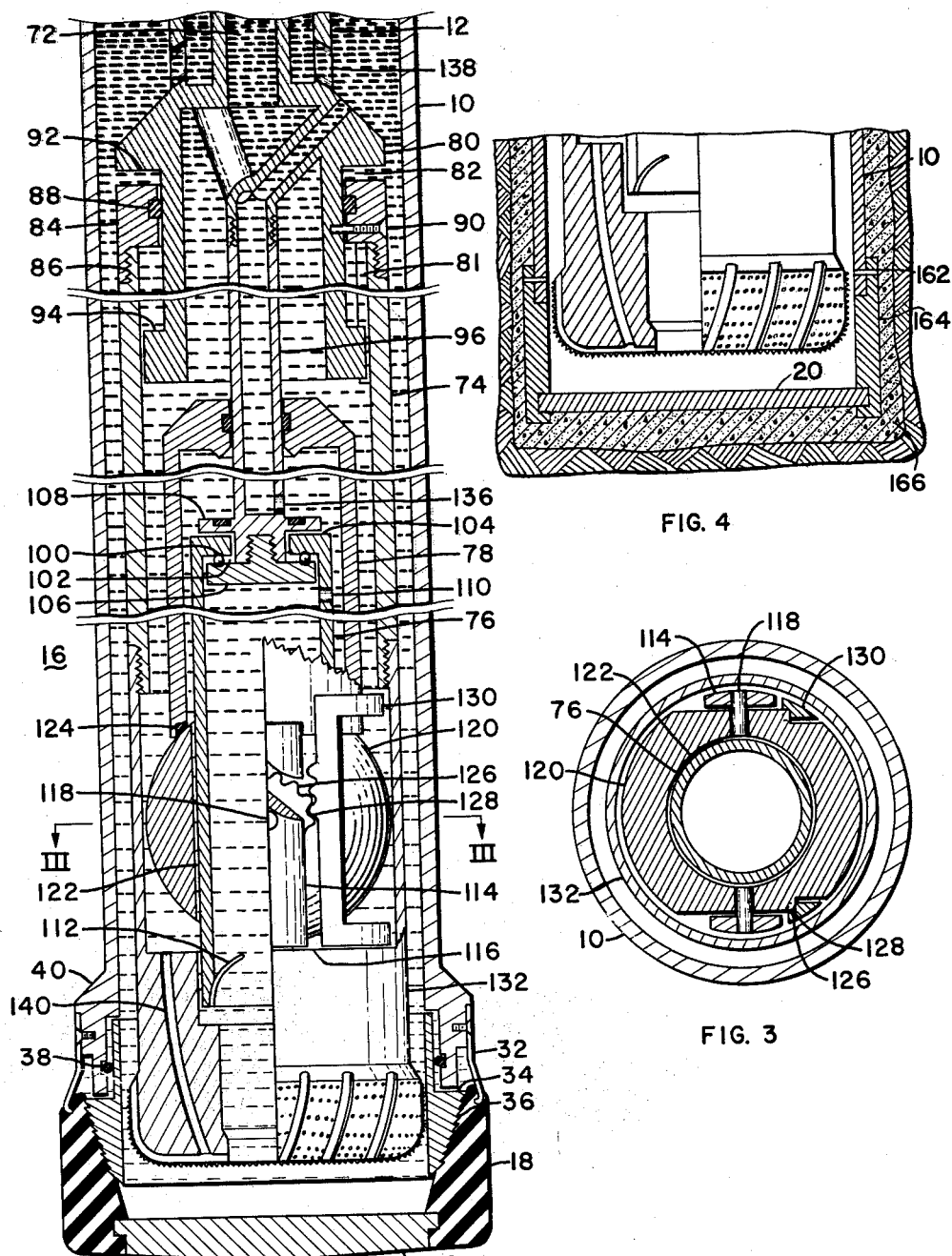
Harold C. Bridwell  Inventor
By John D. Gassett  Attorney

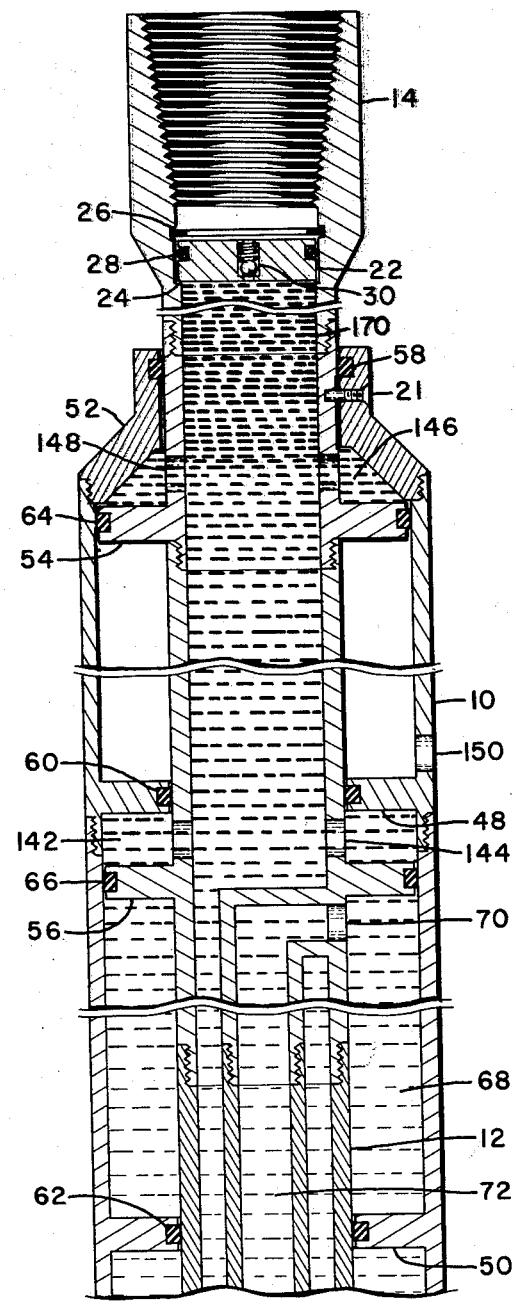
FIG. 1-B
Harold C. Bridwell  Inventor

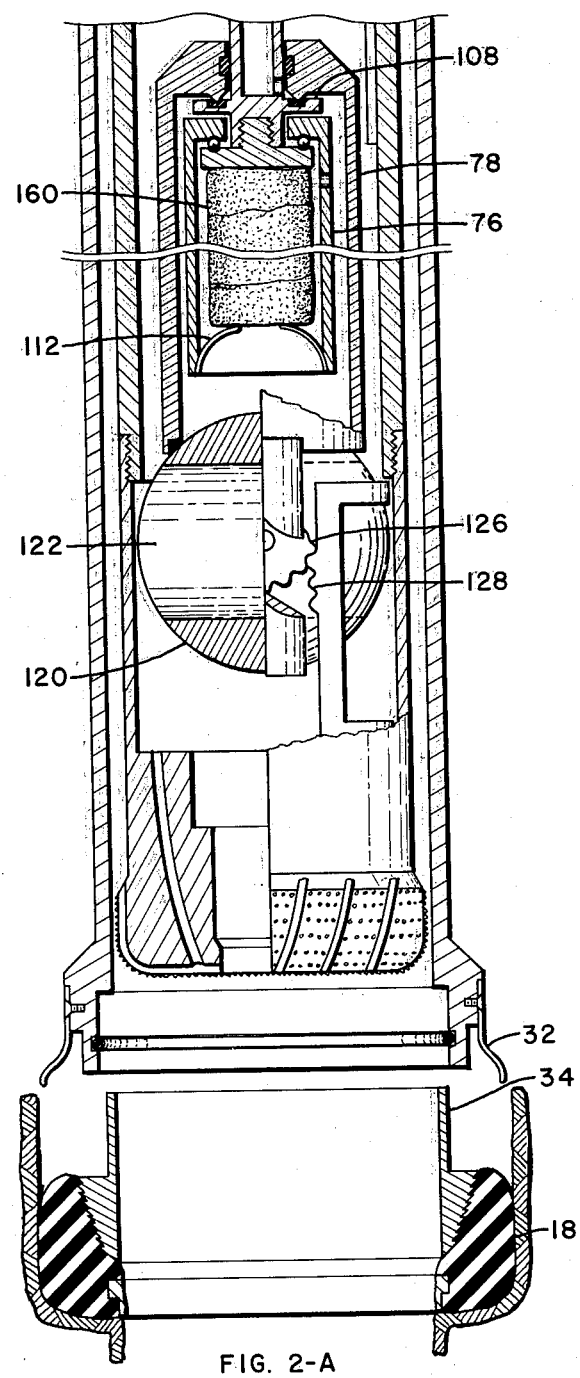
FIG. 2-A
Harold C. Bridwell — Inventor

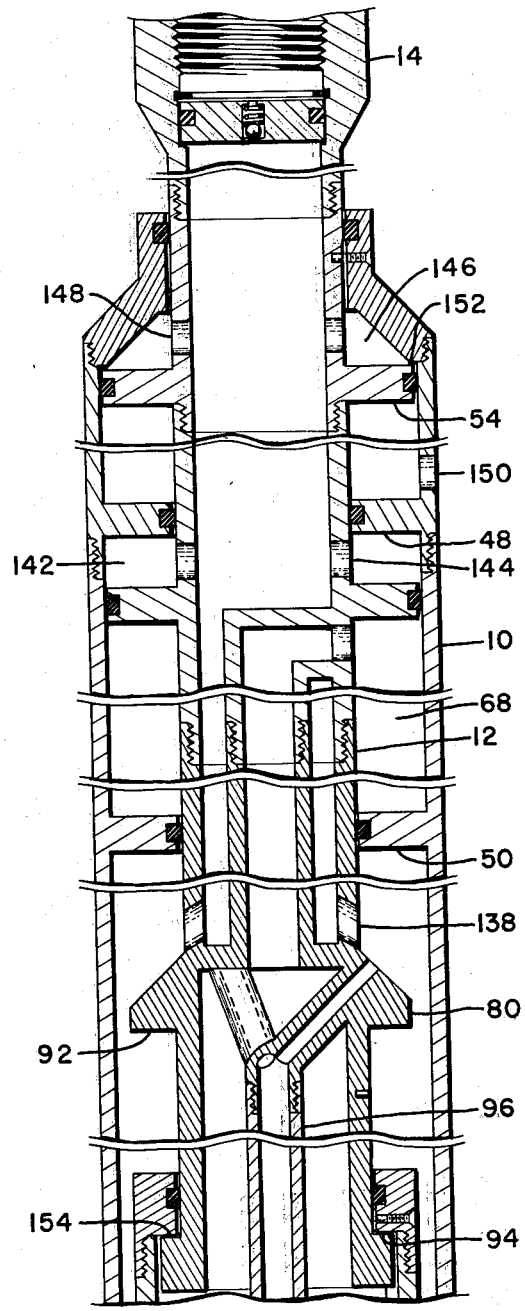
FIG. 2-B
Harold C. Bridwell  Inventor
By John D. Gassett  Attorney

United States Patent Office 3,146,837
Patented Sept. 1, 1964

3,146,837
SYSTEM FOR OBTAINING TRUE CORE SAMPLES
Harold C. Bridwell, Tulsa, Okla., assignor to Jersey Production Research Company, a corporation of Delaware
Filed Dec. 30, 1958, Ser. No. 783,844
6 Claims. (Cl. 175—59)

The present invention concerns means for obtaining an uncontaminated core sample from a subterranean formation. It particularly relates to a method and apparatus for obtaining an uncontaminated core sample having a true reservoir content from a petroliferous formation at the bottom of the borehole or a well which penetrates the formation. The method and apparatus are particularly characterized by the fact that the core sample is cut in the presence of a non-imbibing fluid which is under substantially the same pressure as the formation pressure.

A serious and important problem that confronts the petroleum producing industry at the present time is one of obtaining reliable samples of petroliferous formations that lie underneath the surface of the earth. The core sample to be completely reliable must be uncontaminated and retain its fluid content under formation pressures. The problem has become one of particular importance in view of the ever increasing use of secondary recovery methods for obtaining additional oil from oil reservoirs that have ceased primary production. It is essential before initiating a secondary recovery procedure in any such reservoir to have as much information as possible about the structure, the fluid content, the pore volume, the permeability, etc., of the reservoir. Such information is extremely valuable in determining whether the reservoir formation is susceptible of successful exploitation using secondary recovery techniques and just which technique should preferentially be used. It is also important to determine true formation content of newly discovered reservoirs. This information is extremely valuable in determining the natural reserves of petroleum products and also in determining the most desirable method of primary production such as the most efficient rate of production.

In line with the growing emphasis of secondary recovery projects, many petroleum producers are conducting extensive analysis of old reservoirs and fields whose reservoir pressure has declined to a point where it is not economical to produce the fields. In an effort to evaluate these old reservoirs in order to determine whether a secondary recovery project can be successively applied to them, the producers are conducting an extensive sampling program. One sampling technique has been to drill and sample the bottoms or side walls of old wells that were originally producing wells associated with a reservoir. It has been determined, however, that samples obtained by this technique are often not true representatives of the field or reservoir as a whole and never completely representative of the reservoir fluid content. Accordingly it has become more and more the established practice to drill entirely new holes from the earth's surface down to the reservoir and obtain samples of the reservoir formation directly from these new holes. Conventional drilling and coring methods such as rotary and cable tools have been employed for this purpose. In all of these types of drilling, however, it is necessary to use at least a small amount of drilling mud, water, or other drilling fluid in the bottom of the hole in order to lubricate the bit and to dispose of the cuttings.

These presence of the drilling mud, water, or other drilling liquid in the hole still constitutes an undesirable feature when sampling the reservoir for the reason that the hydrostatic pressure and wetting effects of even a small amount of liquid always changes the fluid content to some degree of the samples that are obtained.

The presence of drilling mud, water, or other drilling liquid in a hole constitutes an undesirable feature when sampling the reservoir for the reason that the hydrostatic pressure and wetting effects of the liquid are considered to seriously interfere with the reliability of the samples that are obtained. The sample obtained must be cut and maintained at its formation pressure in order that its true fluid content may be determined upon subsequent analysis after the core has been brought to the surface. It is accordingly an object of the present invention to provide an apparatus and method for obtaining reservoir core samples from which a true fluid content determination of the reservoir can be obtained. It is a further object of the invention to provide means for coring a formation to maintain continuously the core sample under its natural conditions of pressure and fluid content both during and after the coring operation. These and other objects are realized in accordance with the present invention.

Briefly, this invention pertains to a coring apparatus for recovering cores which retains the true fluid content of the formation. The apparatus is adapted to be suspended at the lower end of a string of drill pipe and includes a pressure core receiving barrel and bit for cutting and receiving the core. The core barrel and bit are rotationally supported and enclosed within a housing which has a drillable plate enclosing its lower end. The housing also has a bottom hole packer or sealing device at the lower end thereof which seals the lower end of the housing with the borehole wall after the housing is set on the bottom of the borehole. The core barrel and the housing are filled with a non-imbibing fluid prior to lowering the apparatus in the borehole. By "non-imbibing fluid" it is meant a fluid that has no tendency to enter the rock or formation under zero pressure differential. Pumping means are provided for circulating the non-imbibing fluid past the bit for removal of the cuttings. The circulation of the fluid is within the enclosed or isolated portions of the apparatus and around the core being cut. The housing remains stationary during drilling operations. A volume-compensating system is provided in order that the volume within the system to be occupied by the circulating fluid remains constant as additional portions of the drill string enter the housing as the bit drills downwardly cutting the core.

In drilling operations the apparatus is filled with the non-imbibing fluid at the surface and is lowered to the bottom of the borehole. At this point the packing or sealing means are set sealing the enclosing chamber at the bottom end thereof to the borehole walls, thus isolating or separating the bottom of the tool and the formation to be drilled from the borehole fluid pressure. The drill string is then rotated at the surface and the core bit drills through the drillable plate at the bottom of the apparatus. Pressure in the formation then is exerted upon the non-imbibing fluid in the apparatus; thus the pressure of the fluid equals the pressure of the formation. This equalized pressure is maintained during coring operation. While the core is being cut, pumping means circulates a drilling fluid past the bit aiding in removing the cuttings. The drilling fluid is a non-imbibing fluid with respect to the rock being cut and is under the same pressure as the formation pressure; therefore, the rock sample is not contaminated. During coring operations the core enters the core-retaining barrel of the pressure core barrel assembly and when sufficient core has been cut, the core sample is parted in a conventional manner and is held within the core-receiving barrel as by means of a conventional core catcher. The core receiving barrel is then sealed under formation pressure. The core barrel assembly containing the core at formation pressure is then removed to the surface where the core may be analyzed.

The method then is seen to include a drilling system located at the bottom of the borehole in which the circulating fluid is isolated from the remainder of the borehole and is maintained during coring operations under formation pressure. As the fluid is non-imbibing and under the same pressure as the formation, it is thus seen that a core sample is cut and recovered which contains a true fluid content of the formation.

The invention may be better understood by reference to the attached figures wherein:

FIG. 1-A and FIG. 1-B comprise a sectioned vertical view of a coring apparatus of this invention at it would be just prior to coring operations with FIG. 1-A illustrating a lower portion of the apparatus and FIG. 1-B an upper portion;

FIG. 2-A and FIG. 2-B comprise a sectioned vertical view of the coring apparatus shown in FIG. 1-A and FIG. 1-B as it would be immediately following a coring operation with FIG. 2-A showing a lower portion and FIG. 2-B showing an upper portion;

FIG. 3 is a section taken along the line III—III of the apparatus shown in FIG. 1-A; and FIG. 4 illustrates the apparatus sealed to the bottom of a borehole by concrete.

Turning to FIG. 1-A and FIG. 1-B, it will be observed that the coring assembly illustrated therein includes an outer enclosing housing 10, a mandrel 12 slidably and rotatably supported within said housing, tool joint 14 for securing the mandrel to a string of drill pipe, a pressure core barrel generally designated 16 within housing 10, a packer 18 at the lower end of housing 10, a drillable closure plate 20 enclosing the lower end of housing 10, and a plug 22 in the lower end of tool joint 14. It is seen then that the pressure core barrel and bit and mandrel 12 are enclosed in a fluid pressure tight system by the enclosing chamber 10, plug 22, packer 18 and closure plate 20. Shear pin 21 holds housing 10 rigid with respect to mandrel 12.

Plug 22 is held within tool joint 14 by shoulder 24 and snap ring 26 in a conventional manner. O-ring seal 28 seals the plug with the tool joint. A pressure relief valve 30 is provided in the plug. This relief valve can be set at a pressure slightly above formation pressure and will relieve any excess pressure which might possibly be encountered.

Packer 18 and closure plate 20 are fabricated in a sealing relationship with each other. The packer 18 is suspended or supported from enclosing housing 10 by packer holding springs 32. Seating ratchet 34 with teeth 36 engage packer 18 and form a sealing relationship therewith. O-ring 38 seals the seating ratchet 34 with the lower section 40 of the enclosing housing 10.

Enclosing housing 10 has internal annular shoulders 48 and 50. Enclosing chamber 10 also has an annular cap 52. Mandrel 12 has spaced apart external annular shoulder members 54 and 56. The outside diameter of external shoulder members 54 and 56 is approximately the same as the internal diameter of the enclosing chamber 10. The internal diameter of internal shoulders 48 and 50 and annular cap 52 is essentially the same as the external diameter of mandrel 12. The annular cap 52 is sealed with mandrel 12 by packing 58; internal shoulder member 48 is sealed with mandrel 12 by packing 60 and internal shoulder 50 is sealed with the mandrel by packer 62. External shoulder 54 is sealed with the inner wall of the enclosing chamber 10 with packing 64 and external shoulder 56 is sealed with packing 66. Packings 58, 60, 62, 64, and 66 may be any suitable packing such as a V-ring packing.

In the practice of this invention a pump is provided to drive the fluid past the bit and aid in removing the cuttings as they are being cut. The pumping means illustrated in FIG. 1 includes annular shoulder 56 which serves as a piston and the annular cylinder or circulating fluid reservoir 68 between the outer wall of the mandrel 12 and the inner wall of chamber 10 and between internal annular shoulder 62 and annular shoulder of piston 56. As mandrel 12 moves downwardly with respect to outer chamber 10 during coring operations, it is seen then that annular shoulder 56 is in effect a piston which drives fluid from annular cylinder 68 through outlet port 70 located in the wall of mandrel 12. A circulating fluid supply conduit 72 is fluidly connected to outlet port 70 and the interior of the pressure core barrel 16. The pressure core barrel 16 illustrated in FIG. 1-A and FIG. 1-B and which is suspended at the lower end of mandrel 12, has an outer or working barrel 74, a core or receiving barrel 76, and a sleeve 78 disposed between the core-receiving barrel 76 and the outer barrel 74. Various parts of the apparatus are preferably fabricated from several component parts as shown for ease of manufacture and assembly.

At the lower end of mandrel 12 is a supporting member for supporting the outer barrel 74. This member 80 is provided with recess section 82 in which an annular member 84 is disposed. Annular member 84 is connected by suitable threads 86 to the outer barrel. A packing 88 is provided between annular ring 84 and the recess section 82. A shear pin 90 is provided to hold outer barrel 74 rigid with respect to member 80. When shear pin 90 is broken, the outer barrel has vertical slidable movement with respect to member 80. Splines 81 prevent rotation of outer barrel 74 with respect to member 80. The slidable movement is limited by shoulder 92 and its lower movement limited by shoulder 94 of member 80.

Sleeve 78 is rotationally supported from relief tube 96 which in turn is supported from the mandrel 12. Core-receiving barrel 76 is also supported from the lower end of relief tube 96 by pivot means such as ball bearings 100 disposed in recess 102 in the lower side of the annular shoulder 104 and recesses in support member 106 which is connected by threads to relief tube 96. Relief tube 96 has annular shoulder members 108 for holding shoulder 104 in place.

Core-receiving barrel 76 has a plurality of ports or passageways 110 near its upper end. Only one of the passageways 110 is shown. It is also provided with core catchers 112 at its lower end. Positioned around and partially enclosing core-receiving barrel 76 is sleeve 78 which terminates in bifurcated extensions 114 which rests upon shoulder 116. Each extension 114 has a pivot 118 upon which a spherical or ball type valve 120 is supported. Valve 120 has port 122 which, when the valve is opened, enables core-receiving barrel 76 to move through the valve. Valve seat 124 is located at the lower end of the main body of the sleeve 78.

Portions of the surface of ball valve 120 are geared as at 126 so as to engage racks 128 in member 130. Member 130 is in effect a segment of a cylinder which is held rigidly between upwardly facing shoulder 116 of coring head or bit 132 and the lower end of outer barrel 74. The coring head 132 is connected to the lower part of outer barrel 74. A rack 128 along each side of member 114 engages a separate geared portion 126.

Relief tube 96 has a port 136 in its wall immediately above member 108. Port 136 together with core-receiving barrel relief port 110 and the annular space between core-receiving barrel 76 and sleeve 78 provide fluid communication between the interior of relief tube 96 and the interior of core-receiving barrel 76. Relief tube 96 opens into the annular space below internal flange 50 and between mandrel 12 and housing 10. Circulating fluid return ports 138 are provided in the lower end of mandrel 12 below internal annular members 50.

Conduits 140 in bit 132 provide fluid communication between that space inside outer barrel 74 exterior of sleeve 78 and the exterior of outer working barrel 74.

Above piston 56 and below annular shoulder 48 is an annular circulating fluid return reservoir 142. Inlet ports 144 in the walls of mandrel 12 provide fluid communication between the interior of mandrel 12 and return reservoir 142. The rate of increase and the total increase in size of volume of reservoir 142 is equal to the rate of decrease and the total decrease in volume of annular cylinder 68.

Above annular shoulder 54 and in the annular space between mandrel 12 and cap 52 and housing 10 is a volume equalizing compartment 146. Immediately above shoulder 54 in the walls of mandrel 12 are inlet ports 148 which establish fluid communication between equalizing compartment 146 and the interior of mandrel 12. The volume of equalizing chamber 146 increases as the mandrel 12 moves downwardly relative to enclosing housing 10. This rate of increase is equal to the rate of increase in the volume of the mandrel 12 entering the system; that is, the volume of the mandrel which would occupy space formerly occupied by non-imbibing fluid. The volume of the mandrel is considered to be the cross-sectional area of the mandrel (both wall and internal passage) times the vertical distance moved with respect to housing 10. This can conveniently be accomplished by making the cross-sectional area of the equalizing chamber 146 equal to the cross-sectional area of the mandrel. Bleed off ports 150 establish fluid communication between the annular space above annular shoulder 48 and below annular shoulder 54 and the exterior of the housing 10.

Having discussed the various structural features of the apparatus of the invention, attention is now directed to a brief description of the manner in which the apparatus is employed. At the outset of this description it is well to note that the apparatus is intended primarily for use in conjunction with a conventional string of drill pipe. Thus, the assembly illustrated in FIG. 1–A and FIG. 1–B is secured to the lower end of a string of drill pipe as a means of the threaded tool joint 14. However, before securing the apparatus to the lower end of a drill string, the apparatus is filled with a non-imbibing fluid 170. This can conveniently be done by removing tool joint 14 and injecting the non-imbibing fluid directly into the open mouth of mandrel 12.

Insofar as the choice of non-imbibing fluid is concerned, it is necessary that this material flow readily under the ambient conditions that prevail during a coring operation and that it be substantially chemically inert toward the apparatus as well as toward the core sample. The fluid is to be non-imbibing, immiscible and insoluble with water or oil. This fluid could be mercury, gallium, a low melting alloy, non-wetting silicone, or the like. It is additionally preferred that the agent possesses lubricating qualities so as to reduce the amount of friction that customarily exists between the core and the core-receiving barrel.

After the apparatus has been completely filled with the non-imbibing fluid, the tool joint is screwed into the open mouth of the mandrel 12 thus closing the apparatus. The tool joint is then connected or secured to a conventional string of drill pipe. With the coring assembly disposed in this manner, the drill pipe and the attached assembly are then lowered to the formation which is to be cored.

When the apparatus reaches the formation to be cored, sufficient force is applied through the drill string in the apparatus so as to force the packer firmly against the walls of the borehole. Seating ratchet 34 is thus forced downwardly against packer 18 which is seated on the bottom of the borehole forcing it outwardly against the borehole wall. Seat 36 of ratchet 34 bites into the packer, thus securely holding the ratchet and the packer together thus holding the packer in an expanded position against the borehole wall.

After the packer has been set, additional weight is applied to the drill string shearing shear pin 21 permitting mandrel 12 to rotate and move downward with respect to housing 10. The core-receiving barrel and the bit are then free to move downwardly until the bit contacts drillable plate 20. Mandrel 12 is forced down an additional distance to shear pin 90. At this point the apparatus is revolved as by means of a conventional rotary table and drilling apparatus and the cutting teeth of the bit are driven into the drillable plate. As the bit passes out of the plate into the formation, the non-imbibing fluid pressure equalizes to the formation fluid pressure. However, the outer enclosing chamber 10 which is secured to packer 18 remains in a fixed position. As the core is cut it enters core barrel 76. At the same time fluid is forced from fluid reservoir 68 by the downward movement of piston 56 through outlet port 70. The fluid flows downwardly through circulating fluid supply conduit 72 and through the space between sleeve 78 and outer barrel 74. The fluid then flows through conduit 140 past the bit head where it aids in lubricating the bit and removing the cuttings therefrom. The fluid is then returned upwardly through the annulus between the outer wall of outer barrel 74 and the inner wall of enclosing chamber 10. The returning fluid flows upwardly through mandrel 12 through inlet ports 144 and to circulating fluid return reservoir 142. It is thus seen that the amount of fluid flowing out through outlet port 70 from fluid reservoir 68 is equal to the volume of fluid flowing into inlet port 144 and to circulating fluid return reservoir 142.

As the core is being cut a part of the fluid in core-receiving barrel 76 flows down around the walls of the core. However, a portion of the fluid in core-receiving barrel 76 flows out through relief port 110, through port 136 and upwardly through relief tube 96 and outwardly to the stream of fluid flowing through circulating fluid return port 138.

As additional volume of mandrel 12 enters the enclosing housing 10, the size of equalizing compartment 146 increases, thus fluid flows inwardly through inlet ports 148 into this compartment and the total volume in the system occupied by the fluid remains constant throughout the operation.

The drilling continues until the full length of the core desired to be cut has been cut. Attention is now respectfully directed to FIGS. 2–A and 2–B which shows the apparatus ready to be removed from the borehole.

When coring has been completed, the core may be parted in a conventional manner as by decreasing the load on the bit and rotating it at an increased rate. With the core parted, the core catchers 112 serve to hold the core within the barrel 76. At this point, the drill string and the tool joint 14 are raised which raises mandrel 12. The lifting of mandrel 12 also raises relief tube 96. Core-receiving barrel 76 is lifted by relief tube 96 with respect to the outer barrel until shoulder 94 comes in contact with shoulder 154 of the outer barrel. The positions of the various component parts of this apparatus can clearly be seen in FIG. 2–B. The core barrel is held securely within core-receiving barrel 76 by core catchers 112. Sleeve 78 which encompasses the core-receiving barrel is closed or sealed off at the bottom by ball valve 120 which has been rotated into closed position when plate 108 lifts sleeve 78 to which the valve is attached. In other words, gears 126 mesh with rack 128 thus closing the valve. The core 160 is held within the core-receiving barrel 76 which is sealed within sleeve 78 at formation pressure. The core was also cut at formation pressure. The drill pipe is lifted further until shoulders 54 rest against a lower shoulder 152 of annular cap 52. The entire apparatus is then ready to be removed from the borehole to the surface. Normally packer 18 will pull loose from the borehole wall and be removed with the apparatus to the surface. However, if the packer is stuck to the well bore wall packer holding springs 32 are pulled away from packer 18. In this event the entire apparatus less packer 18 and ratchet 34 is removed to the surface. The core is recovered to the surface with its true fluid content as the pressure surrounding the core is still the same as the formation pressure which is also the pressure at which the core was cut. The leaving of ratchet 34 and packer 18 in the bottom of the borehole presents no problem in additional drilling of the borehole inasmuch as each are drillable.

It is of course understood that many modifications may be made in the system illustrated. For example, reference is made to FIG. 4. This figure illustrates a different way of sealing the housing 10 to the bottom of the borehole. Cement 166 is poured in the bottom of the borehole and the apparatus is then lowered to the bottom and forced into the cement before the cement has set. A drillable sub 164 is secured at the lower end of housing 10 by shear pin 162. Drillable plate 20 is held by drillable sub 164. The apparatus remains in the position as shown in FIG. 4 until the cement has set. At this time drilling and coring operations may be commenced similarly as described above. After the core has been cut, the apparatus may be removed as previously described by shearing shear pin 162. The material remaining in the borehole is readily drillable.

The embodiment of the apparatus described herein is illustrative and is not to be construed as limiting.

The invention claimed is:

1. A coring apparatus arranged to be operated at the lower end of a string of drill pipe in a borehole which comprises an outer housing, a packer means attached to the lower end of said housing for sealing said housing against the wall of the borehole, a drillable plate means closing the lower end of said housing, a mandrel within said housing and adapted to be attached to said string of drill pipe, means for sealing the outer wall of said mandrel to the upper end of said housing in a sliding relationship, a closure plate in the upper end of said mandrel, a pressure coring barrel and bit, means to attach the lower end of said mandrel to the bit, a non-imbibing fluid within said housing, pumping means within said housing for circulating said drilling fluid by said bit, volume compensating means to compensate for the volume of said mandrel entering said housing as said mandrel is lowered with respect to said housing during drilling operations, and means for sealing the lower end of said core-receiving barrel upon raising said mandrel.

2. A coring apparatus arranged to be operated at the lower end of a string of drill pipe in a borehole which includes: an outer housing being characterized by having an upper internal annular shoulder member and a longitudinally spaced apart lower internal annular shoulder member and an annular cap member longitudinally spaced from said shoulder members; packer means attached to the lower end of said housing for sealing against the wall of the borehole; a drillable plate enclosing the lower end of said housing; a mandrel within said housing and rotatably and sealingly engaging said cap and being further characterized in being attachable to a string of drill pipe; a pressure core barrel and coring bit attached to the lower end of said mandrel; an upper external annular shoulder member and a lower external annular shoulder member on said mandrel slidably and sealingly engaging the inner wall of said housing with said upper exterior annular shoulder member being spaced between said upper internal annular shoulder member and said cap and with said lower external annular shoulder member being disposed between said internal annular shoulder members, external shoulder members sealingly engaging the inner wall of said housing; sealing means between the internal shoulder members of said housing and the outer wall of said mandrel; a conduit means leading from the interior of said pressure core barrel to a cylinder formed by the annular space between the mandrel and housing and between the lower annular shoulder member and lower internal annular shoulder member; a fluid return reservoir defined between said lower external annular shoulder member and said upper internal annular shoulder member; return conduit means for returning circulating fluid from the exterior of said pressure core barrel and below said lower internal annular shoulder member to said circulating fluid return reservoir; a port in the walls of said mandrel establishing fluid communication between the interior of said mandrel and a volume compensating chamber above said upper exterior annular shoulder member with the volume of said volume compensating chamber so designed to increase in volume as said mandrel moves downwardly with respect to said housing in the same amount as the volume of said mandrel entering said housing, and a port in said housing above said upper internal annular shoulder member.

3. An apparatus for obtaining a true fluid content core and arranged to be operated at the lower end of a string of drill pipe in a borehole which comprises in combination: an outer housing; means for closing the annular space between the lower portion of said housing and the wall of said borehole; a drillable plate means closing the lower end of said housing; a pressure core barrel and core bit within said housing; means to rotate said core bit whereby as said core bit is rotated a core is cut and means for sealing the upper end of said housing.

4. In a coring apparatus arranged to be positioned in a borehole at the lower end of a drill string including a pressure core barrel and a coring bit, the improvement which comprises: an outer housing slidably and sealingly engaging said drill string and enclosing said core barrel; means for sealing the lower end of said housing to the wall of said borehole; pumping means in said housing for circulating a fluid past said bit; and a volume compensating means in fluid communication with the interior of said housing and responsive to and operable upon axial movements of the drill string with respect to said housing to provide compensating volume within said housing equal to the volume of drill string entering said housing.

5. In a system of coring a subterranean formation from the bottom of a borehole wherein a coring bit secured to the lower end of an outer barrel member is driven into the formationg and the resulting core forced into a core barrel, the improvement which comprises: means of enclosing the outer core barrel and sealing such means with the bottom of the hole; means for maintaining at formation pressure a body of non-imbibing and non-compressible fluid within and about said core barrel as the core is cut; means for circulating said fluid past said bit during a coring operation; and means for sealing the cut core in the pressure core barrel at formation pressure.

6. In a system of coring a subterranean formation from the bottom of the borehole wherein a coring bit secured to the lower end of an outer core barrel member is driven into the formation and the resulting core forced into an inner core barrel, the improvement of means for sealing the core from fluid within the bore hole which comprises the combination: means for enclosing the core barrel in a pressure sealed relation with the bottom of said borehole forming an enclosure; a non-imbibing fluid within said enclosure; and means for maintaining the fluid under essentially formation pressure while the core is being cut.

References Cited in the file of this patent

UNITED STATES PATENTS

| | | |
|---|---|---|
| 2,146,263 | Johnston | Feb. 7, 1939 |
| 2,214,551 | Edwards | Sept. 10, 1940 |
| 2,238,609 | Sewell | Apr. 15, 1941 |
| 2,256,552 | Drake | Sept. 23, 1941 |
| 2,264,449 | Mounce | Dec. 2, 1941 |
| 2,373,323 | Macready | Apr. 10, 1945 |
| 2,541,785 | Smith | Feb. 13, 1951 |
| 2,830,667 | Walstrom | Apr. 15, 1958 |
| 2,862,691 | Cochran | Dec. 2, 1958 |
| 2,880,969 | Williams | Apr. 7, 1959 |